United States Patent [19]

Oliver

[11] Patent Number: 5,204,896
[45] Date of Patent: Apr. 20, 1993

[54] OUTBOUND TELEMETRY DEVICE
[75] Inventor: Stewart W. Oliver, Venice, Calif.
[73] Assignee: Telegenics, Inc., Los Angeles, Calif.
[21] Appl. No.: 880,299
[22] Filed: May 5, 1992

Related U.S. Application Data

[63] Continuation of Ser. No. 565,505, Aug. 10, 1990, abandoned.
[51] Int. Cl.⁵ .......................................... H04M 11/00
[52] U.S. Cl. .................................. 379/106; 379/107; 340/870.02
[58] Field of Search ................ 379/106, 107, 98, 104, 379/105, 102; 340/870.02, 870.03

[56] References Cited

U.S. PATENT DOCUMENTS

| | | |
|---|---|---|
| 3,588,357 | 6/1971 | Sellari . |
| 3,656,112 | 4/1972 | Paull . |
| 3,868,640 | 2/1975 | Binnie et al. . |
| 3,899,639 | 8/1975 | Clevely et al. . |
| 3,922,490 | 11/1975 | Pettis . |
| 4,180,709 | 12/1979 | Cosgrove et al. . |
| 4,213,119 | 7/1980 | Ward et al. . |
| 4,315,248 | 2/1982 | Ward . |
| 4,489,220 | 12/1984 | Oliver . |
| 4,540,849 | 9/1985 | Oliver ................................ 379/107 |
| 4,578,536 | 3/1986 | Oliver et al. . |
| 4,642,635 | 2/1987 | Snaper . |
| 4,710,919 | 12/1987 | Oliver et al. . |
| 4,839,917 | 6/1989 | OLiver . |
| 4,852,152 | 7/1989 | Honick ................................ 379/106 |
| 4,958,371 | 9/1990 | Damoci et al. ....................... 379/107 |

OTHER PUBLICATIONS

Ameritech Technical Reference, "Ameritech Automatic Meter Reading Services Interface Specifications" pp. 34-39, Mar. 1989.
Telephony Magazine, "Utility Pins Hopes on Meter Reading System" Nov. 18, 1985.

Primary Examiner—James L. Dwyer
Assistant Examiner—Ahmad F. Matar
Attorney, Agent, or Firm—Mark P. Kahler

[57] ABSTRACT

A outbound telemetry device type of meter interface unit (MIU) is provided which enables the automated collection of utility consumption information from a telephone subscriber's site via a conventional subscriber phone line between a central office and the subscriber's site. The unit includes a processor which is capable of collecting consumption information at the subscriber's site. The processor draws electrical power from the phone line in an electrically isolated fashion. When the unit detects the presence of an alerting signal intended for that particular unit, the unit seizes the phone line. The processor then transmits telemetry data with respect to the information back over the phone line. The unit continues the seizure of the phone line for so long as the telemetry data transmission from the processor continues. The unit includes a data detection circuit which detects when the telemetry data transmission ceases. A disengaging circuit within the meter interface unit disengages the unit from the phone line when the detection circuit detects that the telemetry data transmission has ceased. In this manner the unit readily accommodates telemetry data transmissions of virtually any size including variable duration without seizing the subscriber's phone line for undue periods of time.

6 Claims, 2 Drawing Sheets

OUTBOUND TELEMETRY DEVICE

This is a continuation of application Ser. No. 07/565,505 filed Aug. 10, 1990, now abandoned.

CROSS REFERENCE TO RELATED PATENT APPLICATIONS

This patent application is related to my copending patent application entitled "Signal Processing Unit For Use In Telemetry Devices" (Ser. No. 07/565,847) which is filed concurrently herewith.

BACKGROUND OF THE INVENTION

This invention relates in general to data collection systems and, more particularly, in one embodiment to an improved apparatus and method for monitoring conditions at a predetermined location.

During the course of the last decade, automatic meter reading (AMR) systems have evolved from a largely theoretical concept to a proven technology. The primary application for AMR systems is to collect utility meter readings from customer premises via the existing public telephone network.

Most utility meter readings are now collected manually by each utility on a regular basis. At great expense, a water meter reader drives or walks to each home or business. Yet another meter reader drives mr walks to each home or business to read the electric meters. Still additional meter readers read gas meters and other utilities. This manual utility consumption data collection effort represents a very substantial expense to the utilities involved. The economic benefit and labor saving potential for AMR systems, which automate this otherwise manual data collection task, become readily apparent.

In addition, a properly designed AMR system is also capable of collecting meter readings from a plurality of utility meters located on customer premises. Since most American households purchase metered commodities from several different utility companies (electricity, water, gas, etc.), the readings from all utility meters at a single residence can be simultaneously collected thereby increasing the efficiency of the data collection process even further. Automatically collecting these readings via existing customer telephone lines is clearly an advantageous method and one certainly less error prone than the manual ("meterman") method which it replaces.

In addition to the obvious economic benefits, AMR systems also provide features which cannot be obtained practically by manual data collection methods. For instance, meters at customer premises can be read at will thereby providing time of day readings and peak or excessive or random interval measurements to be made at very little cost. Under such circumstances, the payback period to recover the initial installation costs is very short. The economic and technical feasibility of AMR systems, coupled with the flexible performance and monitoring capabilities which they inherently provide, make it very likely that these systems will ultimately replace the inefficient manual methods now being used to collect utility meter readings from businesses, residences and industry.

Figure 1:
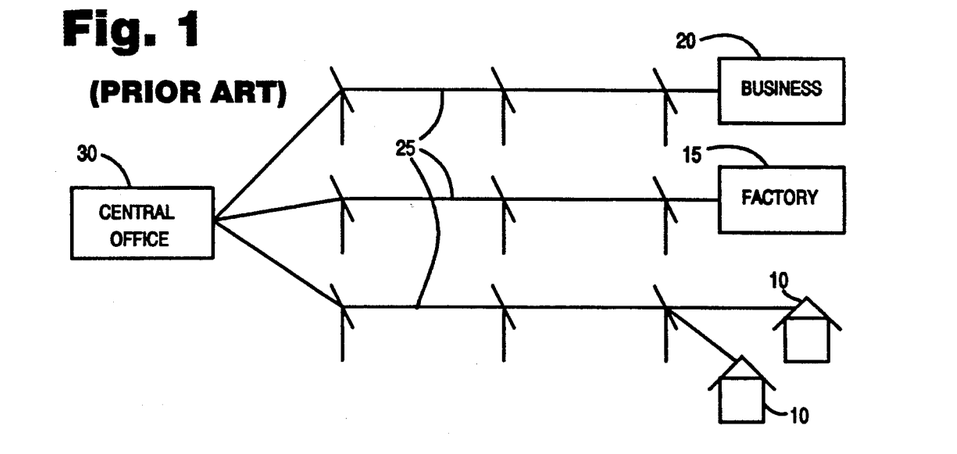
FIG. 1 is a simplified block diagram of several residences, factories and businesses coupled via trunk lines to a telephone central office (CO).

The following is a brief discussion of the operation of one conventional AMR system which demonstrates the basic structure and the elements of such a system. FIG. 1 shows a simplified block diagram of several residences 10, factories 15 and businesses 20 coupled via trunk lines 25 to a central office (CO) 30. At first glance, the operation of AMR systems may seem deceptively straightforward. However, the pragmatic aspects of designing the individual components within the system has been a major obstacle hindering the implementation of AMR systems. Many of the problems encountered in the design of AMR systems involve the vagaries of the telephone system itself and the wide variations in certain relevant parameters thereof. All these factors, coupled with a requirement for any AMR equipment placed at customer premises to be highly reliable while simultaneously being cost effective, combine to make the design of this equipment far from an elementary task. It is only very recently that equipment capable of meeting the stringent requirements of this technology has become available.

As seen in FIG. 1, a typical AMR system uses the same telephone lines which provide normal subscriber telephone voice service without any alteration of telephone company equipment. When an AMR system is present on a subscriber's telephone line, there is no perceivable difference to the customer as to how the voice telephone system operates in comparison to an identical telephone system without AMR capability. In AMR systems, it is very desirable to have a minimal impact on the design of the existing telephone network.

Figure 2:
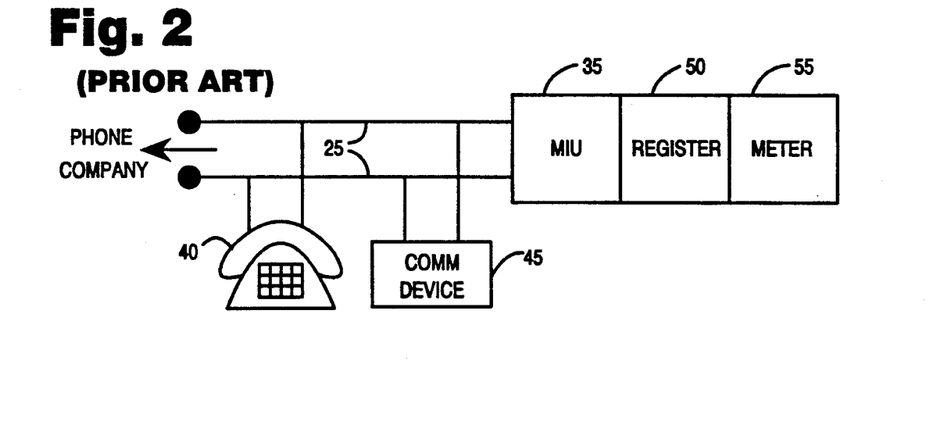
FIG. 2 is a block diagram showing a typical arrangement for connecting a meter interface unit to a subscriber telephone line.

FIG. 2 is a block diagram of the additional equipment required at the customer's premises (shown as 10, 15 or 20 in FIG. 1) to make the operation of the AMR system possible. To provide non-intrusive operation with respect to the voice operation of the subscriber phone line, the AMR equipment at the customer's premises simply "bridges" or parallels the existing telephone circuits. If properly designed, the AMR equipment will not negatively affect the operation of that telephone equipment.

As seen in FIG. 2, an MIU (meter interface unit) 35 is connected in parallel with the subscriber telephone line 25 at each remote site or customer premises. Connected in a similar parallel manner to the phone line are the telephone set 40 and other communications devices 45 which the customer might use such as answering machines, FAX telecopiers, computer modems and the like. For purposes of this discussion, one user device will not be distinguished from another and, in this context, a "telephone set" is used to mean any one of the user supplied devices.

It is again emphasized that the MIU connects to or bridges the phone line without adversely effecting the operation of the other devices on the line and that this property is not an inherent feature of the telephone network. Had the concept of a voice telephone system developed simultaneously with that of an AMR system, the need for the very specialized technology required to couple an MIU to a subscriber phone line may not have been encountered. However, such was not the case in that voice telephone systems clearly developed prior to AMR systems. For this reason, significant problems are encountered when attempting to get AMR systems and voice messaging systems to coexist on the same telephone line without one interfering with the other.

While these user supplied devices (phone, fax, modem, etc.) are under the direct control of the consumer who provides them, the MIU is part of a separate network belonging to a utility company or utility meter agency which needs to collect utility use data. Since the MIU and the telephone set cannot function simultaneously on the same subscriber line, one or the other must have priority. Since the AMR system is automated and the telephone company will not tolerate any degradation in subscriber telephone service, the choice, by default, is that the telephone subscriber or user must have priority over any AMR function.

Attached to MIU 35 are one or more electronic registers 50 which are physically attached to the bodies of utility meters 55. These registers can be read electronically by the MIU but may also have the same dials as their mechanical counterparts. These registers 50 serve to electronically collect the amount of metered commodity delivered to a customer, just as mechanical registers record such information mechanically with indicating dials. In most AMR systems, the electronic register converts the mechanical motion of a flow sensor into a serial format, similar to the familiar RS-232 format, which can be electronically transferred when the device is interrogated in a prescribed manner. Such an arrangement minimizes the number of wires required to electrically interface the MIU to the electronic register.

Each of the above mentioned components of an AMR system is strategically and logically placed in accordance with its function. The MIU is placed near a telephone line and is connected to one of more utility meters which are each placed by the corresponding utility in an appropriate location. For example, an MIU might be placed where the phone line enters the customer premises while the water meter is located in an underground pit, the electric meter at the power drop, and the gas meter in still a different location. It is, of course, possible to combine the MIU and electronic register functions although not very practical unless the utility installation has been specially configured, which most existing sites have not. Furthermore, since each of the utility meters is owned by a different utility company which is responsible for calibrating and guaranteeing their accuracy, the MIU and electrically encoding register functions are most likely to remain as functionally separate devices. The MIU serves as the hardware interface between the utility meters (equipped with electronic registers) and the telephone line. As such, it is desirable, although not required, that the MIU be powered directly from the phone line without any reliance on external power sources or batteries which would increase maintenance costs.

As the primary interface between the phone line and utility meter apparatus, the MIU also serves another extremely important purpose, namely that of electrically isolating the telephone line from the surrounding electrical environment. This isolation barrier is necessary to prevent electrical transients from damaging the MIU or utility apparatus attached to the MIU and vice-a-versa. In addition, since this isolation barrier provides protection to service personnel and customers alike, the phone company will generally not permit the installation of equipment which does not provide a specified degree of protection.

Figure 3:
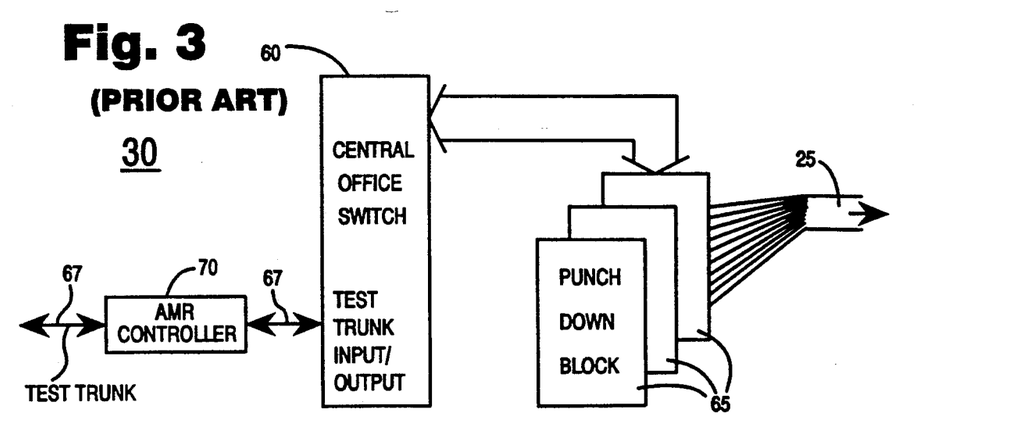
FIG. 3 is a block diagram of connection and switching equipment at a conventional telephone central office.

As seen in the block diagram of central office 30 in FIG. 3, a single central office site serves a plurality of remote users. Central office 30 includes a central office "switch" 60 and one or more "punch down blocks" 65. Phone lines 25 are essentially a bundle of wires which enter central office 30 and which are connected to one or more of punch down blocks 65. From punch down blocks 65, the subscriber lines pairs within this wire bundle are connected to central office switch 60. Each subscriber line has a known port on the central office switch 60 which can be uniquely addressed by calling a specific telephone number.

Associated with the central office switch 60 is a test trunk 67 which the telephone company uses to test subscriber lines attached to the switch 60. These tests help the service provider to ascertain the condition of any or all of the cable pairs attached to the switch, for maintenance purposes. Although most subscribers are unaware of such a function, the telephone company routinely checks the condition of the telephone line on a regular basis. Since these testing capabilities are an integral part of the central office switch design, the test trunk provides an ideal interface point for an AMR controller 70. By using the test trunk, AMR controller 70 utilizes capabilities already incorporated into the switch by design, to minimize disruptions to subscriber service caused by activity on the test trunk. Thus test trunk 67 is the access point for AMR controller 70 to selectively connect to a given MIU. Part of the AMR controller function is to maintain a table of "phone" numbers which can be "dialed" on the test trunk thereby providing connectivity to the desired MIU device or devices.

Now that the basic structure of a conventional AMR system has been depicted, the operation of a typical AMR system is discussed in more detail. One of the advantages of these systems is that the operational scenarios for AMR procedures are relatively straightforward. If there is any contention for the subscriber line while the AMR procedures are underway, the AMR equipment should disengage itself.

Returning again to FIG. 2, in its quiescent state the MIU 35 is always anticipating the reception of an alerting signal. This alerting signal is originated by the AMR controller at the central office when there is a need to communicate with an MIU located on particular customer's premises. MIU 35 often includes a low power (micro-power) detector circuit for detecting the presence of the alerting signal, such circuit being powered from the phone line by "leakage" current. In this example, the AMR controller at the central office will only generate the alerting signal if the subscriber phone line is "on-hook", i.e. available.

MIU telemetry devices may be either of the outbound or inbound type. For purposes of this application, "outbound" telemetry devices are those telemetry devices which are couplable to a phone line and which are selectively activated by an alerting signal sent over the phone line from a central source. Thus, the particular MIU described above is an example of an outbound telemetry device. In contrast, "inbound" telemetry devices are devices which are couplable to a phone line at a subscriber's site and which dial in to a central location to communicate information to such location. Such inbound telemetry devices typically include a real time clock which causes the device to wake up and dial in to the central location at a predetermined time. MIU's which are of the inbound telemetry devices type may be employed where the environment is appropriate.

Returning to the present example of FIG. 2 which depicts an outbound telemetry device type of MIU, the earlier mentioned alerting signal could be a tone of specified frequency, amplitude and duration while the detector is a selected tone detector which is capable of recognizing the specified frequency, amplitude or duration. Upon reception of the alerting signal, the MIU will "seize" the phone line and typically uses the loop current drawn from the central office switch (20-80 MA) to bias itself to a fully powered-up condition. This fully powered-up state during which the MIU has seized the phone line is referred to as the active mode of the MIU, as opposed to the quiescent mode of the MIU during which the MIU is awaiting the alert signal.

Using a predetermined signalling protocol, a microprocessor within the MIU sends telemetry data (meter reading information) down the phone line to the waiting AMR controller which initiated the alerting signal. The design of the typical MIU is such that the alerting signal can only be acted on if the phone line is "on-hook", this is, the line is not is use. Stated alternatively, when the subscriber line is active, the MIU disengages itself from the phone system. Thus, in the unlikely event that an alerting signal might be present during an ongoing phone conversation (voice falsing) or data exchange (computer modem) the MIU cannot be inadvertently activated.

In more detail, separate so called "static off-hook" detectors and "dynamic off-hook" detectors were provided in prior MIU's to avoid the above described contention situations where the phone user and MIU would potentially conflict in their use of the common phone line. Prior to the present invention, the terms "static off-hook" and "dynamic off-hook" detector were often used. (Quite often the terms could be related directly to separate clusters of individual circuit elements which each performed the respective referenced function.) The descriptive terms "static" and "dynamic" described the MIU state at the time the telephone set was lifted "off-hook", presumably by a subscriber who wished to place an phone call.

The "dynamic off-hook" detector functionally disengaged the MIU from the subscriber line if the MIU was currently active, i.e. sending telemetry data to the AMR controller. In contrast, the "static off-hook" detector prevented the MIU from becoming active at times when the telephone set is off-hook. MIU devices of the prior art typically had separate circuit elements which were alternately engaged in the "static" mode and disengaged in the "dynamic" mode.

In conventional MIU's, some time after the telemetry exchange between the MIU and the AMR controller is completed, the MIU releases the phone line, restoring it to an idle condition. The MIU then returns to the quiescent state and awaits the reception of another alerting signal. However, the possibility exists of a microprocessor malfunction or other malfunction which could cause the MIU to never release the phone line back to the on-hook condition.

To prevent this from occurring, conventional MIU's typically include a watchdog timer which is activated when an alerting signal is received by the MIU. Then, after a predetermined period of time set by the watchdog timer, the MIU is forced to restore the phone line back to the on-hook condition. The predetermined time period associated with the watchdog timer is generally a relatively long period of time, for example 4-5 minutes or longer, so as to be sufficiently long to accommodate the longest anticipated telemetry transmission. However, many telemetry data transmissions last only a few seconds. In these instances, much time may be wasted if the MIU has to rely on a watchdog timer to instruct the MIU to disengage from the telephone line and return use of the line to the phone subscriber.

BRIEF SUMMARY OF THE INVENTION

Accordingly, one object of the present invention is to provide an outbound telemetry device which avoids the problems associated with watchdog timers/failsafe timers common in prior outbound meter interface units.

Another object of the present invention is to provide an outbound telemetry device which exhibits both increase reliability and decreased parts count.

Yet another object of the present invention is to provide an outbound telemetry device which does not undesirably tie up a subscriber phone line should the processor in the outbound telemetry device momentarily fail.

Yet another object of the present invention is to provide an outbound telemetry device which is capable of efficiently and transparently accommodating variable length telemetry messages.

In accordance with the present invention, an outbound telemetry device is provided. The outbound telemetry device is locatable at a site and is couplable to a phone line at the site. The outbound telemetry device is capable of monitoring conditions at the site and includes a first detecting circuit, coupled to the phone line, for detecting the presence of an alerting signal on the phone line and providing a detect signal when the alerting signal is detected. The device further includes an accessing circuit, coupled to the first detecting circuit, for engaging the phone line in response to the detect signal and for disengaging the phone line in response to a disengage signal. The devices includes a transmitting circuit for transmitting telemetry data on the phone line in response to the detect signal, the data containing information with respect to the conditions. The device still further includes a second detecting circuit, coupled to the transmitting circuit and the accessing circuit, for detecting the cessation of transmission of the telemetry data. The second detecting circuit provides a disengage signal upon cessation of transmission of the telemetry data, such that the outbound telemetry device is disengaged from the phone line when the cessation of the telemetry data is detected.

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

This invention pertains to a novel apparatus and method for switching an outbound telemetry device such as an MIU from an active mode, wherein the outbound telemetry device is exchanging telemetry data with an AMR controller, to a quiescent mode wherein the outbound telemetry device anticipates the arrival of an alerting signal. In actual practice, an outbound telemetry device or MIU generally spends the majority of its time in this anticipatory quiescent mode.

Figure 4:
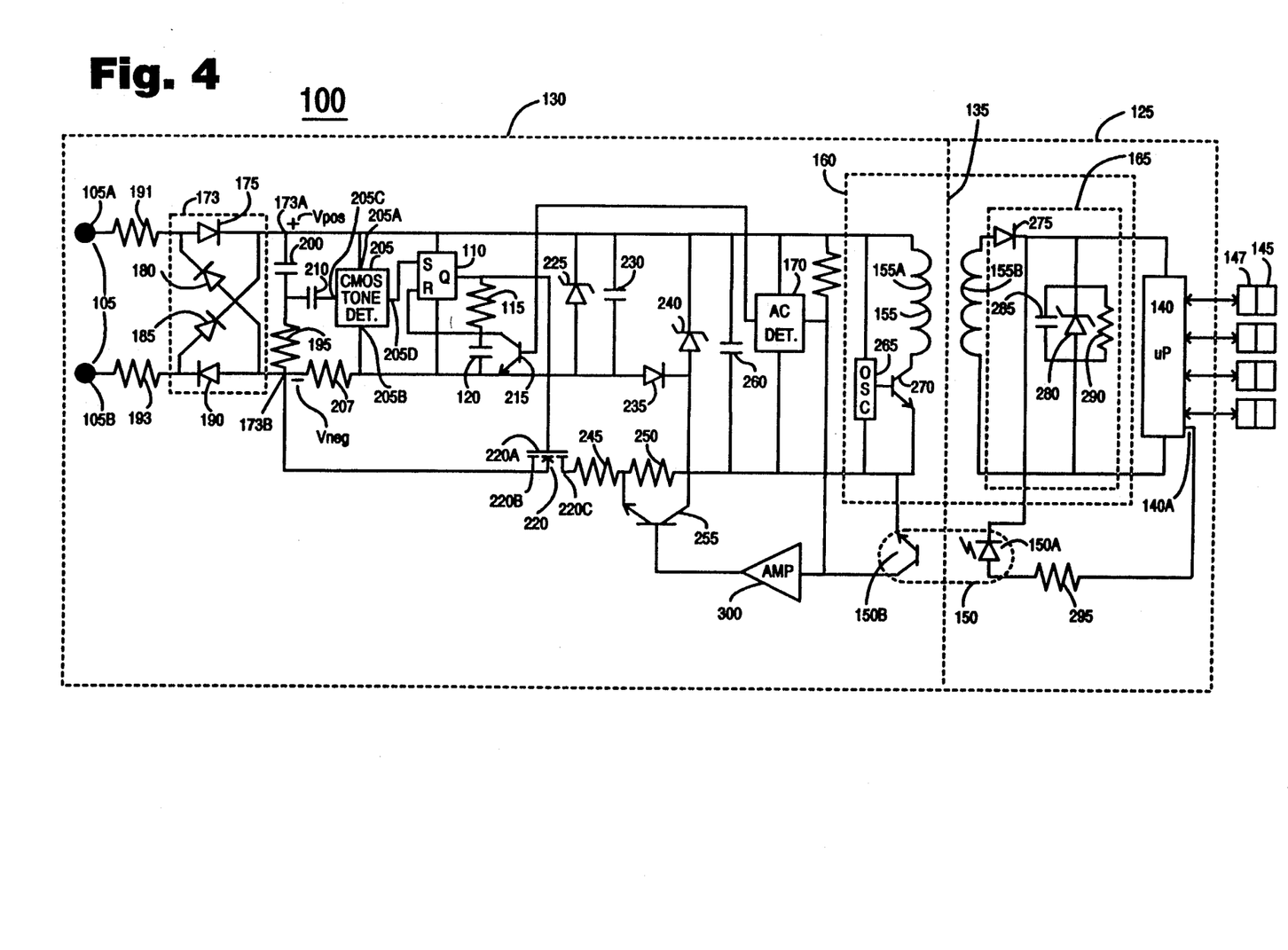
FIG. 4 is a schematic diagram of one embodiment of the outbound telemetry device of the present invention.

FIG. 4 shows a schematic representation of one embodiment of the outbound telemetry device of the present invention as meter interface unit (MIU) 100. A general description of the operation of MIU 100 is now presented. This general description will be followed by a more detailed description of the components and operation of MIU 100. The portion of MIU 100 which actually accomplishes shut off or disengagement of the MIU from a subscriber phone line 105 is monostable flip-flop 110. A time constant is associated with the setting and resetting of flip-flop 110 as will be discussed later in more detail. The monostable nature of this flip-flop circuit component assures that the MIU can not seize a subscriber phone line for more than a brief instant of time.

When an alerting signal is detected on phone line 105 in a manner later described, flip-flop 110 is set, thereby taking the MIU "off-hook" and seizing the phone line. A relatively short delay is programmed by an R-C network (formed by resistor 115 and capacitor 120) when flip-flop 110 is set. When this delay expires, flip-flop 110 returns to a reset condition, disengaging the MIU from the telephone line.

The structure of the MIU is conveniently divided into two parts, namely a data gathering portion 125 and a communications link portion 130. An isolation barrier, shown figuratively as barrier 135, couples the data gathering portion 125 to the communications link portion 130 in an isolative manner discussed later in detail. Communications link portion 130 is situated on the phone line side of the isolation barrier 135 and includes the aforementioned MIU shut-off circuitry. The data gathering portion 125 is situated on the utility side of isolation barrier 135 and includes a microprocessor 140 which interfaces with various utility meters 145 and which formats a telemetry data packet to be transferred to an AMR controller (not shown) which is coupled to phone line 105.

Microprocessor 140 is substantially isolated from telephone line 105 by first, an optical-isolator 150 (discussed later) which transfers telemetry data from microprocessor 140 across isolation barrier 135, and secondly a transformer 155 (discussed later) which forms part of a DC-to-DC converter 160 that electrically isolates the power supply 165 for microprocessor 140 from phone line 105.

Upon receiving an alerting signal (a tone burst of specified frequency, amplitude and duration) from the AMR controller on phone line 105, monostable flip-flop 110 is set causing the DC-to-DC converter 160 to become active thereby biasing up and providing power to microprocessor 140. Microprocessor 140 then collects readings from utility meters 145 which are attached to MIU 100. Each of utility meters 145 is outfitted with a respective electronic register 147 which collects utility consumption information as described earlier. Microprocessor 140 formats a packet of telemetry data to be transferred back across isolation barrier 135 to phone line 105 for subsequent reception by the AMR controller which originated the alerting signal.

The monostable time constant or time delay is sufficiently long (for example 1 second) to provide adequate time margin for "waking-up" of microprocessor 140, but need not be so long as the time period of the entire telemetry packet, which could take many seconds or even minutes. That is, the time constant of resistor 115 and capacitor 120 is a relatively short period of time as will be discussed later in more detail. In fact, in the preferred embodiment of the invention, this time constant is substantially less than the time period of the telemetry packet generated by microprocessor 140 to include the collected utility consumption information.

As noted earlier, this telemetry data or packet is transferred across isolation barrier 135 via optocoupler 150. On the phone line side of isolation barrier 135, communications link portion 130 includes an AC voltage detector 170 which follows the level transitions made by the digital data transferred across optocoupler 150. AC voltage detector 170 periodically resets monostable flip-flop 110, tracking the digital transitions of the telemetry data, thereby repeatedly resetting the natural time constant before that time interval can expire. This action prevents monostable flip-flop 110 from resetting and disengaging MIU 100 from phone line 105, as long as telemetry data is present on the communication link portion 130 at detector 170.

MIU 100 will automatically effectively disconnect itself from phone line 105 a short time after the transmission of the telemetry data packet ceases, that is, after the RC time constant of resistor 115 and capacitor 120 expires. This action is referred to as "controlled shut-off". However, should microprocessor 140 momentarily malfunction (i.e. become disoriented) the absence of telemetry data signal transitions at the input of AC voltage detector 170 will permit the monostable time constant to expire thereby resetting the MIU and, most importantly, restoring the subscriber phone line to an idle state by effectively disengaging MIU 100 from phone line 105. A significant advantage of the particular circuit implementation provided by the present invention is that there is no need to distinguish between normal and abnormal modes of operation nor is any special separate circuitry required to determine if the MIU is operating properly.

A more detailed description of the components within one embodiment of MIU 100 of FIG. 4 now follows. A description of the operation of these components of MIU 100 will be given later. MIU 100 is coupled to the aforementioned phone line 105 which includes a pair wires 105A and 105B which together form a port for coupling to MIU 100. To assure that the DC voltage supplied to MIU 100 always exhibits the same polarity, a diode bridge circuit 173 including diodes 175, 180, 185 and 190 is coupled across phone lines inputs 105A and 105B via respective current limiting resistors 191 and 193 as shown in FIG. 4. In the particular embodiment of the invention shown in FIG. 4, a positive DC voltage is supplied by phone line 105 to bridge output 173A while a negative DC voltage is provided to bridge output 173B. A series coupled resistor 195 and capacitor 200 are together coupled in parallel with bridge circuit 173.

A CMOS tone detector 205 is coupled in parallel with bridge outputs 173A and 173B such that a source of DC voltage is provided thereto. More specifically, tone detector 205 includes a positive voltage input 205A which is coupled to the positive output of bridge 173. Tone detector 205 also includes a negative voltage input 205B which is coupled to the negative output of bridge 173 via a resistor 207 therebetween. Tone detector 205 further includes an input 205C which is coupled to the juncture of resistor 195 and capacitor 200 via a coupling capacitor 210 such that the alerting signal from the AMR controller is provided to tone detector 205. Tone detector 205 also includes an output 205D which is coupled to the S input of an SR flip flop/monostable latch 110. When tone detector 205 detects an alerting signal from the AMR controller coupled to phone line 105, then tone detector 205 produces a logic high at its output.

Monostable latch 110 is coupled across bridge outputs 173A and 173B such that DC voltage is supplied thereto. Latch 110 includes S (set) and R (reset) inputs and a Q output. The earlier mentioned series RC network formed by resistor 115 and capacitor 120 is coupled between the Q output and the negative output 173B via resistor 207. The juncture between resistor 115 and capacitor 120 is coupled to the reset (R) input of monostable latch 110.

MIU 100 includes a transistor 215, the collector of which is coupled to the juncture of resistor 115 and capacitor 120 as well as the reset (R) input of monostable latch 110. The Q output of monostable latch 110 is coupled to a gate 220A of a power field effect transistor (FET) 220, the source 220B of which is coupled to the negative output 173B of bridge 173. When FET 220 is turned on and off in a manner described later, MIU 100 is respectively engaged and disengaged from the phone line 105.

MIU 100 also includes a zener diode 225, the cathode of which is coupled to the positive output of bridge 173, the anode of which is coupled to emitter of transistor 215. The parallel combination of zener diode 225 and filter capacitor 230 serves as a voltage regulator for the MIU, in the quiescent mode of operation.

A series diode 235 remains reverse biased while the MIU is in the quiescent mode, passing no current. A small amount of DC leakage current is drawn from the phone line through resistor 207 to establish an operating voltage across zener diode 225 and filter capacitor 230 thereby enabling operation of MIU 100 in the quiescent mode.

MIU 100 includes a series resistor combination formed by series coupled resistors 245 and 250, one end of such combination being coupled to drain 220C of FET 220, the remaining end of which is coupled to the juncture between diode 235 and zener diode 240 as shown in FIG. 4. Also as seen in FIG. 4, the emitter and collector of a modulating transistor 255 are coupled across resistor 250 to permit data modulation of the loop current within MIU 100 as will be later described.

The parallel combination of zener diode 240 and filter capacitor 260 acts as a voltage regulator and serves to establish an operating voltage for MIU 100 while it is actively engaged in the transmission of telemetry data as will be later described.

DC to DC converter 160 is coupled in parallel with filter capacitor 260 such that DC voltage is provided thereto to supply DC voltage from the communication link portion 130 of MIU 100 to the data gathering portion 125 of MIU 100 in an electrically isolative manner. More specifically, converter 160 includes an oscillator 265, the output of which is coupled to the base of a transistor 270. Converter 160 includes transformer 155 which includes a primary winding 155A and a second winding 155B. The collector of transistor 270 is coupled through primary winding 155A to positive output 173A of diode bridge 173 as shown in FIG. 4. The emitter of transistor 270 is coupled to the negative terminal of filter capacitor 260 which provides the more negative operating voltage for MIU 100 in an active mode.

A power supply 165 is coupled to the secondary winding 155B of transformer 155 to provide microprocessor 140 of data gathering portion 125 with a source of DC voltage. Power supply 165 includes a rectifier diode 275, the anode of which is coupled to one end of secondary winding 155B. The cathode of a zener diode 280 is coupled to the cathode of rectifier diode 275, while the anode of zener diode 280 is coupled to the remaining end of secondary winding 155B. A filter capacitor 285 and a load resistor are each coupled in parallel with zener diode 280. The supply voltage terminals of microprocessor 140 are coupled in parallel with zener diode 280 to provide microprocessor 140 with converted, regulated DC voltage as will be explained later in detail. DC to DC converter 160 provides microprocessor 140 with a source of DC voltage derived from the voltage supplied from phone line 105 and does so in a manner which desirably electrically isolates microprocessor 140 from phone line 105 as graphically depicted by the isolation barrier at 135.

Microprocessor 140 is coupled to one or more utility meters 145 which are capable of gathering utility consumption information with respect to different commodities and supplying such consumption information to microprocessor 140. Microprocessor 140 includes a data port 140A at which microprocessor 140 supplies telemetry data including the utility consumption information which it gathers.

Opto-isolator 150 is coupled between data port 140A and the communications link portion 130 of MIU 100 to couple the telemetry data from microprocessor 140 back to phone line 105 for transmission to the AMR controller which generated the alerting signal. Opto-isolator 150 includes a light emitting diode transmitter portion 150A and a phototransistor receiver portion 150B. One terminal of the transmitter portion 150A is coupled to the data port of microprocessor 140 via a resistor 295 and the remaining terminal of transmitter portion 150A is coupled to the cathode of diode 275 to receive positive supply voltage therefrom.

The emitter of receiver portion 150B is coupled to the negative terminal of filter capacitor 260 to receive negative supply voltage therefrom. The telemetry data supplied to transmitter portion 150A appears at collector 150B in a manner substantially isolated from the data gathering portion 125 of MIU 100. The collector of receiver portion 150B is coupled to the input of AC detector 170 as seen in FIG. 4 such that AC detector 170 can detect whenever telemetry data is being transmitted by microprocessor 140. The collector of receiver portion 150B is also coupled via an amplifier 300 to the base of modulating transistor 255 to permit the phone loop current transistor 255 to be modulated by the telemetry data for transmission back to the AMR controller.

The following is a more detailed discussion of the operation of the embodiment of the invention depicted as MIU 100 in FIG. 4. It will be recalled that MIU 100 is connected to a phone line 105 through which it communicates with an AMR controller located at a central office facility of the phone company. Also connected to the MIU 100 are one or more electronic registers 147 which are attached to respective utility meters 145 from which commodity consumption information is to be read.

The electrical interface between MIU 100 and subscriber phone line 105 is through the pair of current limiting resistors 191, 193 and diode bridge 173. This makes the installation of the MIU 100 to phone line 105 insensitive to the actual phone line "polarity" and always assures that the more positive potential appears at $V_{pos}$ (bridge output 173A) and the more negative potential at $V_{neg}$ (bridge output 173B) as shown in FIG. 4.

Also coupled across the diode bridge output 173A and 173B is the capacitively coupled network (capacitors 200, 210 and resistor 195) for introducing an audio signal, namely the alert signal, into CMOS tone detector 205. In this particular embodiment of the invention, tone detector 205 is advantageously a digital tone detector although detector 205 is capable of processing analog signals. Tone detector 205 provides a way for the AMR controller to distinguish one MIU from another MIU when multiple MIU's are present on the same phone line. In other words, in that type of installation, detector 205 provides the means by which a particular MIU 100 is notified that the AMR controller is interrogating this MIU 100 as opposed to another MIU 100 on the same phone line to extract the information gathered by microprocessor 140. Different alerting tones are assigned to different MIU's on the same phone line.

Of course in many installations, only one MIU 100 is installed an a particular phone line. In those installations, when tone detector 205 receives its assigned alerting tone, this indicates to such MIU 100 that it is being interrogated for the information gathered by microprocessor 140. The particular design of tone detector 205 is not important to this invention except to the extent that detector 205 should be capable of operating at very low current levels since it essentially operates from line "leakage" power from the telephone switch at the central office.

Tone detector 205 is now discussed in greater detail. In one embodiment of the invention, detector 205 is capable of determining if one of a plurality of alerting tones is present on the phone. If an alerting tone (originated by the AMR controller) is within a specified frequency to which tone detector 205 is tuned, within a specified amplitude range, and/or of a specified duration, detector 205 will provide a logic high output indicating reception of the alerting signal.

For purposes of clarity, the term "quiescent state" is used to describe the condition of MIU 100 prior to reception of the alerting tone, that is, when MIU 100 is in a waiting state and consuming only very low amounts of current from the phone line. The term "active state" is used to describe MIU 100 after MIU 100 receives the alerting tone and seizes the phone line for telemetry transmission purposes. In the active state, MIU 100 still consumes relatively low current from the phone line, although the current consumed is significantly greater than that consumed in the quiescent state.

Resistor 207 limits the current which can be drawn in this quiescent state and exhibits a high impedance such as 5 MΩ for example. Diode 235 isolates tone detector 205 and monostable latch 110 from other parts of the MIU. Resistor 207 is also part of a biasing network for tone detector 205 which helps assure that detector 205 is off when the telephone set is "off-hook". In this manner, when the subscriber is using the phone line for his or her own purposes, MIU 100 can not detect an incoming alerting tone and seize the phone line away from the subscriber.

Zener diode 225 serves as a protective voltage clamp and the voltage developed across it is close to the zener voltage when MIU 100 is in the low current quiescent mode. The filter capacitor 230 across zener diode 225 filters the leakage current which is drawn from the phone line 105, establishing a quiescent operating voltage for tone detector 205 and monostable latch 110. Because monostable latch 110 is normally reset (Q output low), power FET 220 is biased off and consequently all remaining portions of the MIU circuit are off. This is the normal quiescent mode of MIU 100 where only tone detector 205 and monostable latch 110 are biased, drawing only leakage current from the phone line.

Upon the reception of an alerting signal, the output of detector 205 goes high causing monostable latch 110 to be set thus forcing the Q output thereof to a logic high condition. In response to this condition, power FET 110 is turned on and capacitor 120, connected to the reset (R) input of latch 110, begins to be charged exponentially through resistor 115. MIU 100 has now entered the active state. Resistor 115 and capacitor 120 together establish an R-C time constant for monostable latch 110. Unless transistor 215 is turned on, this time constant will expire in about 1 second (or other relatively short predetermined time period) causing MIU 100 to revert to the normal quiescent mode. Transistor 215 is referred to as a discharging transistor in that transistor 215 effectively discharges capacitor 120, resetting the time constant of monostable latch 110. As will be described later, transistor 215 is frequently turned on by transitions of the digital data when data from microprocessor 140 is being transmitted across opto-coupler 150 and is turned off when data is not being so transmitted.

With power FET 255 turned on as described above, MIU 100 seizes the phone line by drawing loop current through a low impedance path formed by zener diode 240, resistors 245 and 250, and the power FET 220. When MIU 100 seizes the phone line in this manner, MIU 100 is said to be in the active state.

Resistors 245 and 250 typically have values in the hundreds of ohms range. The effective value of resistor 250 can be actively changed by transistor 250 thereby current modulating the loop current from the central office switch with the data supplied to transistor 255 via opto-coupler 150. In other words, the modulation applied to this current loop is the telemetry data from microprocessor 140.

Zener diode 240 and the filter capacitor 260 across it act as a voltage regulator to establish a fixed operating voltage for MIU 100 when MIU 100 enters the "active" state. A DC voltage is thus applied to DC-to-DC converter 160 when power FET 250 is turned on in response to the alerting signal. When this occurs, the oscillator circuit 265 within converter 160 will momentarily start thereby applying a switching signal to transformer primary winding 155A, alternately energizing and de-energizing the magnetic field. On the secondary winding side of transformer 155, diode 275 acts as a half wave rectifier with respect to the resultant alternating signal which appears on secondary winding 155B. Zener diode 280 regulates the rectified current generated by diode 165. Filter capacitor 285 and load resistor 290 help convert the alternating signal back to a DC voltage.

The DC voltage established at the output of the DC-to-DC converter 160, namely across zener diode 280, is used to power CMOS microprocessor 140 and is electrically isolated from the phone line side of the MIU through the action of DC to DC converter 160. The efficiency of DC-to-DC converter 160 is not overly critical since the CMOS microprocessor 140, which it powers, requires only a small amount of current (5 MA, typically).

When MIU 100 is powered-up into the active state as described above, microprocessor 140 automatically interrogates the electronic registers 147 coupled to respective utility meters 145. Microprocessor 140 gathers consumption or other information from respective registers 147 and formats a telemetry packet in a preferred protocol containing the gathered information. The telemetry data signal from microprocessor 140 is applied to the LED 150 side of optical-coupler 150 and subsequently appears on the output transistor 150B side of opto-coupler 150. Optocoupler 150 provides electrical isolation from the telephone line 105 for the telemetry data from microprocessor 140. In so doing, opto-coupler 150 contributes to the integrity of the effective isolation barrier indicated at 135.

The telemetry data recovered on the output 150B side of optocoupler 150 is distributed to amplifier 300 for audio shaping and, simultaneously, to a AC detector 170. The design of AC detector 170 is such that it tracks the transitions of the digital data and provides a pulsating logic high output (following the input data stream) while there is data activity. Most importantly, AC detector 170 will provide a continuous logic low output when telemetry data ceases. Therefore, data activity from microprocessor 140 will cause transistor 215 to frequently discharge capacitor 120, essentially preventing it from charging to the threshold voltage of the reset input on latch 110. Should the telemetry data cease, for any reason, the RC network (resistor 115-capacitor 120) charges up as per the time constant $T_1$ associated therewith. When this RC network has charged up (i.e. when the time constant $T_1$ has expired or "timed out"), then the voltage at reset input R of latch 110 is a logic high thus causing latch 110 to be reset. When latch 110 is reset, then the Q output thereof goes low to cause power FET 220 to turn off and release or disengage MIU 110 from phone line 105.

In summary, MIU 100 enters the active state by seizing phone line 105 when it receives an alerting signal and continues to engage the phone line until transmission of telemetry data from microprocessor 140 ceases after which MIU 100 enters the quiescent state upon expiration of the relatively short $T_1$ time constant. Since the $T_1$ time constant of the monostable latch RC network (resistor 115-capacitor 120) is chosen to be longer than the cumulative "power-up" time of the DC-to-DC converter 160 and microprocessor 140 circuits, the presence of telemetry data will be verified by the AC detector prior to monostable latch 110 "timing out" per the $T_1$ time constant. For example, in one embodiment of the invention, $T_1$ is selected to be approximately 1 second. Therefore, the monostable latch 110 time constant $T_1$ is reset shortly after MIU 100 has first detected the alerting signal sent by the AMR controller to interrogate said MIU. When the telemetry data ends, or if the microprocessor malfunctions, the telemetry data will no longer be present at the input to AC detector 170 and the $T_1$ time constant of the monostable latch 110 will expire, switching MIU 100 from the active state to the lower power quiescent state.

The design of MIU 100 always permits MIU 100 to disengage itself from the subscriber phone line in the event the customer takes the phone set "off-hook". In the quiescent mode, the design of the MIU prevents the CMOS tone detector from receiving an alerting signal while another telephone device is off-hook. In the active mode, while MIU 100 is engaged in telemetry transmission, MIU 100 becomes current starved when another off-hook telephone device robs loop current from the phone line, forcing MIU 100 to an off condition.

By properly selecting the value of resistor 290, and other components, the operating current drawn by MIU 100 can be set to assure that the microprocessor 140 intentionally "malfunctions" when another telephone device comes off-hook, thereby robbing current from the active MIU and effectively current starving microprocessor 140. By exactly the same mechanism which terminates a normal telemetry exchange, the "malfunction" or lack of operating current causes the telemetry data being coupled to AC detector 170, via optocoupler 150, from microprocessor 140 to cease. Without data activity at the input to the AC detector 170, transistor 215 remains off and the time constant, established by resistor 115 and capacitor 120, expires thereby forcing the reset of the monostable latch 110 and subsequent disengagement of the MIU from the phone line. This is referred to as "forced shut-off".

The following is summary of many of the more significant features of MIU 100 of the present invention. MIU 100 employs optocoupler 150 to transfer telemetry data across isolation barrier 135. The presence of that telemetry data is sensed by AC detector 170 which switches transistor 215 on to prevent the "timing out" of the monostable latch so long as the telemetry data continues to be transmitted by microprocessor 140. The monostable latch is only required to have a time constant long enough, for example a relatively short period of time such as approximately 1 second, for the MIU 100 device to power up and begin transmission of telemetry data. Of course, MIU 100 would operate if the $T_1$ time constant were longer than this but it need not be so. The $T_1$ time constant could also be somewhat smaller than 1 second consistent with the earlier discussion. For example, the T1 time constant could be as small as approximately 250 mSec in embodiments where the MIU powers up and begins telemetry transmission in less than 250 mSec and could be as long as a relatively short period of time such as approximately 10 seconds.

Once telemetry data transmission is underway, AC detector 170 will continuously prevent monostable latch 110 from returning to its stable state, thereby keeping MIU 100 biased. Should the microprocessor 140 malfunction, momentarily or otherwise, then the ability of microprocessor 140 to generate telemetry data will also cease, causing a loss of signal to AC detector 170 which will subsequently cause MIU 100 to reset a short time thereafter. The MIU of the present invention will readily accommodate variable length telemetry packets since the monostable time constant can only expire after the data ceases. This is referred to as "controlled shut-off" since, presumably, MIU 100 received an alerting signal, responded by returning telemetry data and then disengaged itself from the phone line at the conclusion of this "normal" telemetry exchange.

The same mechanism is used to disengage MIU 100 should the subscriber telephone set be taken off-hook during the telemetry exchange. Whereas MIU devices of the prior art had separate circuits to determine when the user took the phone off-hook during a telemetry data transmission and when the user took the phone off the hook when no telemetry data transmission was occurring, MIU 100 of the present invention accomplish both of these tasks by using a single common circuit.

More particularly, since all devices on the subscriber phone line are in parallel and have a fairly low off-hook impedance (typically 200 ohms), the activation of the subscriber telephone set will shunt current away from MIU 100. MIU 100 is designed to have a sufficiently high operating current requirement so that is becomes current starved when this condition occurs the subscriber telephone set is activated or taken "off-hook". Consequently, MIU 100 cannot derive sufficient operating voltage for microprocessor 140 to operate thus causing the processor to malfunction and transmission of telemetry data, if any, to cease. The value of resistor 290 in DC-to-DC converter 160 is selected to help assure the above circumstance. For example, in one embodiment of the invention, a resistance value of 1000 ohms for resistor 290 is satisfactory although other values will also be satisfactory depending on the particular point at which current starving of microprocessor 140 is desired. The lower the resistance value of resistor 290, the more current resistor 290 draws and hence microprocessor 140 becomes more easily current starved. In some circumstances wherein microprocessor 140 draws a relatively high operating current, resistor 140 may actually be omitted. The exact nature of the "malfunction" of microprocessor 140 is not relevant except that it causes the microprocessor 140 to stop sending telemetry data. It is important to understand that this is an intentionally induced microprocessor malfunction. When the data ceases the monostable latch time constant T will expire and reset MIU 100, relinquishing control of the subscriber telephone line. Appropriately, the above described MIU action is referred to as "forced shut-off".

The apparatus described above to return a subscriber phone line to an idle on-hook condition, placing the MIU into the first quiescent mode awaiting the reception of an alerting signal), can be applied to a plurality of operational scenarios because the techniques taught by this invention do not distinguish between a processor malfunction, the normal conclusion of a telemetry exchange or the interruption of the telemetry exchange when the subscriber telephone set is taken off-hook. In all these scenarios the MIU shuts off when a microprocessor "malfunction" is detected as evidenced by the cessation of telemetry data, whether that malfunction is intentionally induced by the subscriber telephone set going off-hook, the normal conclusion of a telemetry transmission, or if the microprocessor truly malfunctions.

Examples of other outbound telemetry devices in conjunction with which the present invention may be practiced are disclosed and claimed in my copending patent application entitled "SIGNAL PROCESSING UNIT FOR USE IN TELEMETRY DEVICES" (Ser. No. 07/565,847) filed concurrently herewith, the disclosure of which is incorporated herein by reference.

While an outbound telemetry device such as a meter interface unit apparatus has been described above, it will be appreciated that a method for operating an outbound telemetry device in conjunction with a user phone line has also been disclosed. The method of the invention is typically practiced on an outbound telemetry device which is situated at a site, such device being capable of gathering data with respect to conditions at the site. The device is capable of sending the data over the phone line to a central monitoring point. The method includes the steps of the meter interface unit assuming a quiescent state wherein the device monitors the phone line for alerting signals. The method includes the step of detecting the presence on the phone line of an alerting signal assigned to the device. The method further includes the step of seizing the phone line in response to detection of the alerting signal and the step of transmitting telemetry data on the phone line, the data containing information with respect to the conditions. The method also includes the steps of maintaining the device in the active state as long as telemetry data is being transmitted on the phone line and detecting the cessation of transmission of the telemetry data. The method further includes the step of disengaging the device the phone line in response to the detection of cessation of telemetry data transmission. The step of disengaging the device from the phone line occurs with a relatively short predetermined period of time after detection of cessation of telemetry data transmission, and in one embodiment occurs substantially immediately after detection of such cessation.

The foregoing describes an outbound telemetry device apparatus and a method for operating such apparatus. The apparatus and method disclosed desirably avoids the problems associated with watchdog timers/failsafe timers common in prior meter interface units. Moreover, an outbound telemetry device is provided which exhibits both increased reliability and decreased parts count. The disclosed outbound telemetry device advantageously does not undesirably tie up a subscriber phone line should the processor in the meter interface unit momentarily fail.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A remote outbound telemetry device situated at a first location for monitoring conditions at said first location and for reporting information regarding said conditions over a phone line back to a central station situated at second location which is remote from said first location, said telemetry device comprising:

alerting signal detecting means, responsive to an alerting signal on said phone line, for detecting the presence of said alerting signal and providing a detect signal when said alerting signal is detected;

accessing means, coupled to said alerting signal detecting means, for engaging said phone line in response to said detect signal and for disengaging said phone line in response to a disengage signal;

telemetry generating means, coupled to said alerting signal detecting means, for generating telemetry data in response to said detect signal, said data containing information with respect to said conditions;

transmitting means, coupled to said telemetry generating means, for transmitting said telemetry data on said phone line, and AC detector means, coupled to said telemetry generating means and said accessing means, for detecting the presence of AC waveform transitions in the telemetry data generated by said telemetry generating means, said AC detector means providing said disengage signal when the presence of said AC waveform transitions is no longer detected, such that said outbound telemetry device is disengaged from said phone line a predetermined amount of time after the cessation of said telemetry data is recognized by said AC detector means detecting that said AC waveform transitions are no longer present.

2. The outbound telemetry device of claim 1 further comprising modulating means for modulating said telemetry data onto a signal on said phone line.

3. The outbound telemetry device of claim 1 further comprising electrical isolation means, coupled between said telemetry generating means and said phone line, for providing power from said phone line to said telemetry generating means and for providing electrical isolation between said telemetry generating means and said phone line.

4. A method for operating an outbound telemetry device situated at a first location, and which is capable of gathering data with respect to conditions at said first location, said outbound telemetry device being further capable of sending said data over a phone line to a central monitoring station situated at a second location which is remote from said first location, said method comprising the steps of:
   assuming a quiescent state wherein said device monitors said phone line for alerting signals;
   detecting the presence on said phone line of an alerting signal assigned to said device;
   seizing said phone line in response to detection of said alerting signal, said device thus entering an active state;
   transmitting telemetry data on said phone line, said data containing information with respect to said conditions;
   continuously monitoring by said device, when said device is in the active state, for the presence of AC waveform transitions in the telemetry data transmitted by said telemetry device to determine if said telemetry data is being transmitted by said device;
   maintaining said device in the active state as long as telemetry data is being transmitted on said phone line as determined by said continuously monitoring step, and
   disengaging said device from said phone line when said telemetry data is determined not to be present as determined by said continuously monitoring step.

5. A method for operating an outbound telemetry device situated at a first location, and including a processor capable of gathering data with respect to conditions at said first location, said outbound telemetry device being further capable of sending said data over a phone line to a central monitoring station situated at a second location which is remote from said first location, said method comprising the steps of:
   detecting the presence of a first signal on said phone line;
   taking said phone line to an "off-hook" condition when said first signal is detected to engage said device to said phone line;
   providing power to said processor from said phone line in response to detection of said first signal;
   said processor transmitting said data over said phone line to said central monitoring point as telemetry data;
   sensing by said device for the presence of AC waveform transitions in the telemetry data transmitted from said processor to determine the cessation of transmission of telemetry data from said processor;
   maintaining said device in said "off-hook" condition to engage said phone line for so long as said AC waveform transitions are sensed in said sensing step;
   providing a delay equal to a predetermined relatively short period of time after cessation of transmission of telemetry data is determined in said continuously sensing step, and
   returning said phone line to an "on-hook" condition after said delay has occurred to disengage said device from said phone line.

6. The outbound telemetry device of claim 1 further comprising biasing means, coupled between said phone line and said telemetry generating means, for providing DC voltage bias and current from said phone line to said telemetry generating means, the maximum bias current provided by said biasing means being selected such that, when the user activates another communications device on said telephone line, said telemetry generating means becomes current-starved so that any telemetry data then being transmitted by said telemetry generating means ceases, thus causing said AC detector means to no longer detect said AC waveform transitions and in response thereto provide said disengage signal to cause said telemetry device to become disengaged from said phone line.

* * * * *